United States Patent [19]

Hamada et al.

[11] Patent Number: 4,525,869
[45] Date of Patent: Jun. 25, 1985

[54] DIVERSITY RECEIVER

[75] Inventors: Masanori Hamada; Sadao Ono, both of Tokyo, Japan

[73] Assignee: Clarion Co., Ltd., Tokyo, Japan

[21] Appl. No.: 487,483

[22] Filed: Apr. 22, 1983

[30] Foreign Application Priority Data

Apr. 30, 1982 [JP] Japan ................................. 57-73839

[51] Int. Cl.³ .............................................. H04B 7/08
[52] U.S. Cl. .................................. 455/277; 455/278; 455/345
[58] Field of Search ............... 455/133, 134, 140, 272, 455/277, 278, 345, 52, 65

[56] References Cited

U.S. PATENT DOCUMENTS 3,037,113  5/1962  Bier ..................................... 455/277
3,182,263  5/1965  Gossard .............................. 455/277
4,397,041  8/1983  Takeda et al. ..................... 455/277
4,403,343  9/1983  Hamada ............................. 455/277

FOREIGN PATENT DOCUMENTS 2514181   9/1975  Fed. Rep. of Germany ...... 455/277
2827572  12/1979  Fed. Rep. of Germany ...... 455/277

Primary Examiner—Jin F. Ng
Attorney, Agent, or Firm—Flynn, Thiel, Boutell & Tanis

[57] ABSTRACT

The diversity receiver having a plurality of antennas and one receiver comprises a detector means to detect a signal voltage responsive to an antenna output from an intermediate frequency amplifier of the receiver, and a comparator unit to receive two separated components of the signal voltage from the detector unit through two separated paths, so that one of the antennas which is in the best receiving condition is selected in response to an output from the comparator unit.

6 Claims, 11 Drawing Figures

DIVERSITY RECEIVER

BACKGROUND OF THE INVENTION

1. Field of the Invention

This invention relates to a diversity receiver including plural antennas and one receiver so as to switch the antennas in response to their receiving conditions, and thereby suited for use in a car.

2. Description of the Prior Art

An FM receiver mounted in a car or other moving bodies is usually used while the body moves. Therefore, the direction of its antenna always largely changes as compared to a house-use FM receiver, and is apt to disaccord with directions of antennas of broadcasting stations. As the result, it is difficult to block influences by multipath noises.

The receiver of this type is mostly used in a weak electric field because electric field strength for the receiver always varies as the car goes from highways to mountainous places, or from valleys to valleys between tall buildings. Due to this, the receiver must deal with noises intermittently generated within the receiver itself during reception of weak input signals.

One of conventional methods to overcome the above-mentioned problem is to change the receiver from stereophonic mode to monoral mode upon reception of weak input signals, or to attenuate high frequency band wave in addition to the foregoing mode changeover. By this method, however, since S/N (signal-to-noise ratio) improvement measure is taken within the receiver to the input signal received by a single antenna, there is accordingly a limit in said improvement.

Another method is to provide two antennas and two tuners, thereby constructing a so-called diversity receiver so as to switch and select the antennas and the tuners in response to the receiving conditions. Although this method is more effective in said S/N improvement than the above-introduced method, however, provision of two tuners causes increase of production cost and space.

OBJECTS OF THE INVENTION

It is therefore an object of the present invention to overcome the above-mentioned drawbacks involved in the prior art, and to provide a diversity receiver including plural antennas and a single receiver and capable of maintaining always good receiving condition of the receiver.

SUMMARY OF THE INVENTION

In accordance with the present invention, a signal voltage responsive to an input signal received by one of plural antennas and detected by a single receiver is separated into two routes and the separated voltages are compared to each other so that, in response to the result of the comparison, the antennas are switched and one of the antennas which is in the better or best receiving condition is always selected.

DETAILED DESCRIPTION OF THE PREFERRED EMBODIMENTS

Figure 1:
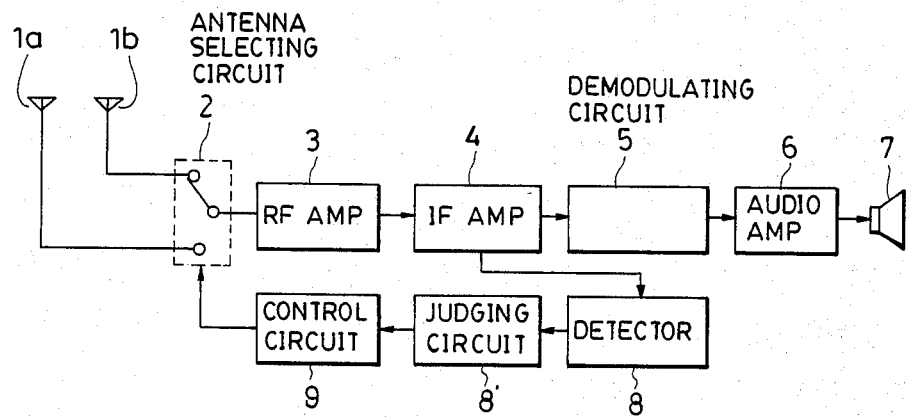
FIG. 1 is a block diagram showing an embodiment according to the present invention.

The present invention will now be described in detail by way of preferred embodiments referring to the drawings.

FIG. 1 is a block diagram of an embodiment of the diversity receiver according to this invention. Reference numeral $1a$ and $1b$ refer to antennas, 2 to an antenna selecting circuit, 3 to an RF amplifier, 4 to an IF amplifier, 5 to a demodulating circuit, 6 to an audio amplifier, 7 to a speaker, 8 to a detector, $8'$ to a judging circuit, and 9 to a control circuit, respectively. The detector 8 detects a signal voltage responsive to an output of the antenna $1a$ or $1b$ from an IF signal from the IF amplifier 4. The judging circuit $8'$ detects a dc voltage proportional to the electric field of a signal received by the antenna $1a$ or $1b$, or detects a dc voltage obtained by comparison and computation of the electric field and the multipath level, and judges whether the receiving condition is good or not. The control circuit 9 controls the antenna selecting circuit to excute or withhold its antenna switching action in response to a signal voltage supplied from the judging circuit $8'$ so that the receiver is always connected to one of the antennas in a better receiving condition.

Figure 2:
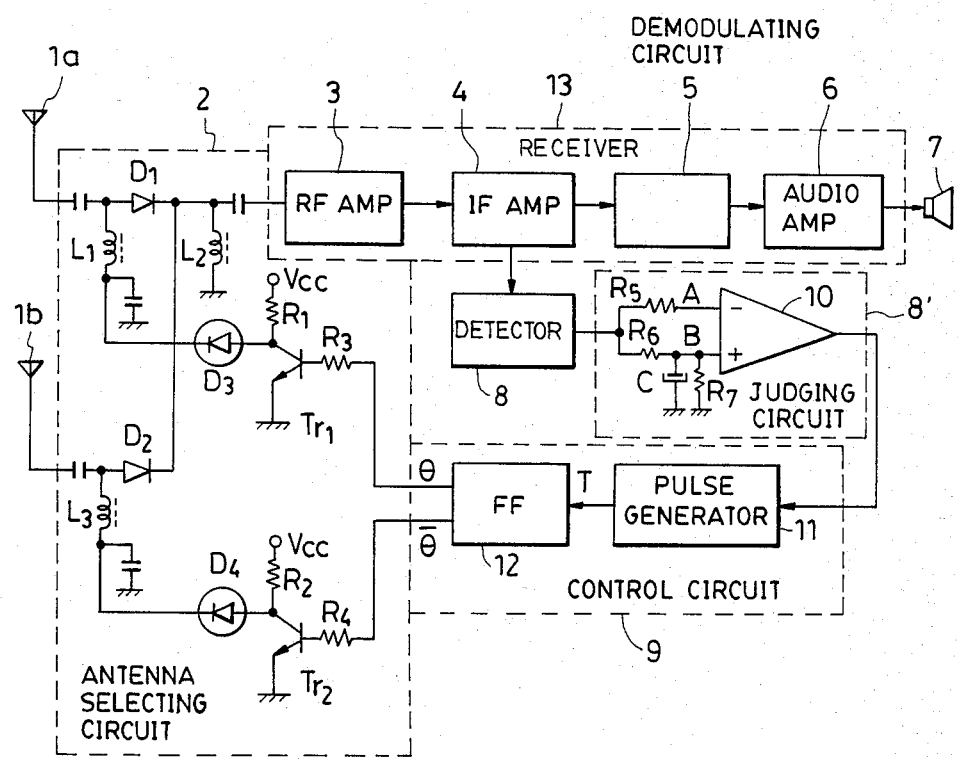
FIG. 2 is a circuit diagram showing a more detailed construction of FIG. 1.

FIG. 2 is a circuit diagram showing a detailed example of the embodiment of FIG. 1. The same elements as those in FIG. 1 are designated by the same reference numerals. $D_1$ and $D_2$ refer to pin diodes for changeover of the antennas, and $D_3$ and $D_4$ refer to light-emitting diodes (LED) for indicating operating one of the antennas. $R_1$ to $R_7$ are resistors, C is a capacitor, $T_{r1}$ and $T_{r2}$ are transistors, $L_1$ to $L_3$ are high frequency blocking choke coils, 10 is a comparator, 11 is a pulse generator, 12 is a flip-flop, and 13 is the main body of the receiver.

Figure 3A:
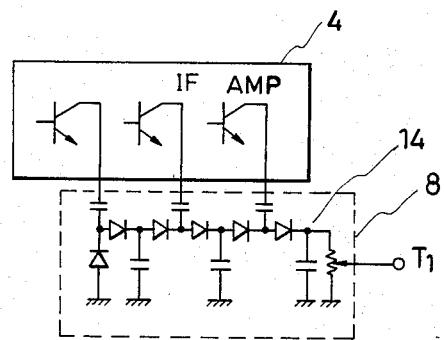
FIGS. 3a and 3b are examples of the detector in the embodiment of FIG. 1.
Figure 3B:
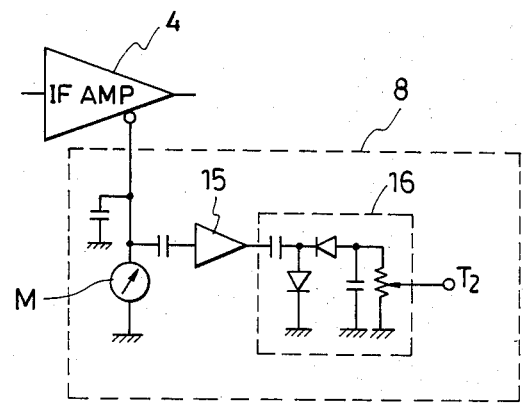

FIGS. 3a and 3b are circuit diagrams showing detailed examples of the detector 8.

The detector 8 of FIG. 3a is designed to obtain a dc voltage proportional to electric field strength of a signal received by the antenna. More specifically, the detectro 8 extracts IF signals from respective stages of the IF amplifier 4 of the receiver 13 and applies them to a rectifier circuit 14, thereby obtaining a rectified and added dc voltage from a terminal $T_1$. The detection of the dc voltage can be effected in the same manner as the voltage detecting method by a normally used S meter (signal-strength meter). If an IC is used for the IF amplifier 4, it is preferred to be of a type having an S meter output terminal.

Figure 4:
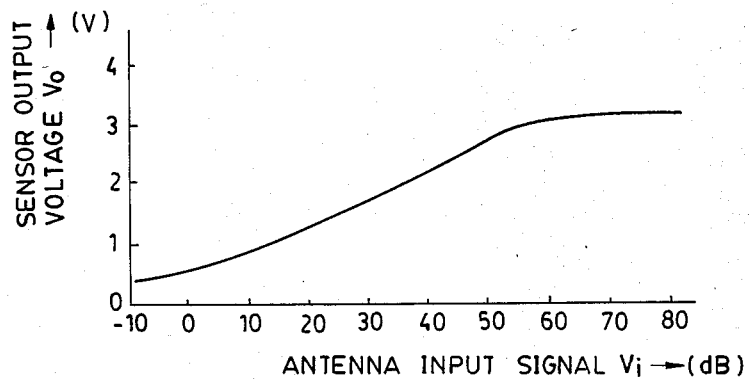
FIGS. 4a and 4b shows properties of the output voltages from the detectors of FIGS. 3a and 3b, respectively.
Figure 4:
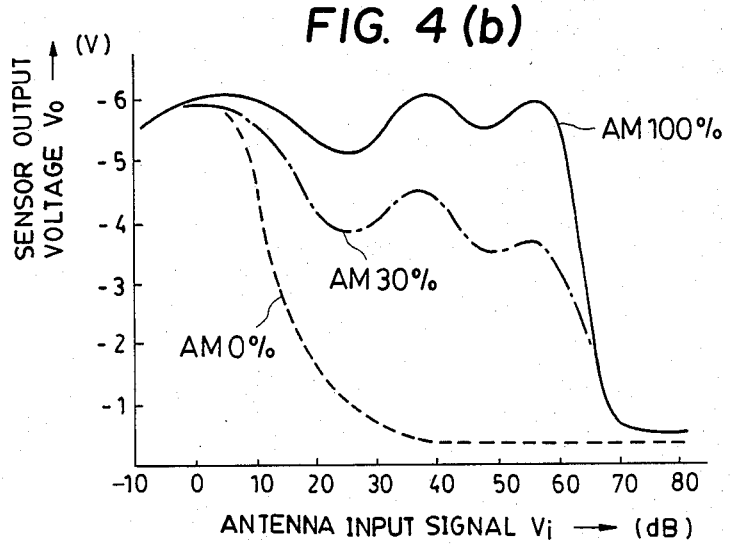

FIG. 4a shows a property of the voltage obtained by the detector 8 of FIG. 3a, with the abscissa being antenna input signal Vi and the ordinate being the output voltage Vo from the detector 8.

The detector 8 of FIG. 3b is designed to obtain a dc voltage proportional to a multipath level. More specifically, this detector 8 detects a dc voltage responsive to an electric field strength as in the example of FIG. 3a so that the pulsating current component of the dc voltage is amplified in an amplifier 15 and is thereafter applied to a rectifier circuit 16, so that an amplified and rectified dc voltage is obtained from a terminal $T_2$. With this arrangement, even if amplitude-modulated component (AM component) and phase-modulated component are grown in the IF signals due to multipath interference, the detector 8 can easily supply an effective output voltage by detecting the amplitude-modulated component (AM component) which can be detected relatively easily.

FIG. 4b shows a property of the output voltage from the detector 8 of FIG. 3b.

Figure 5:
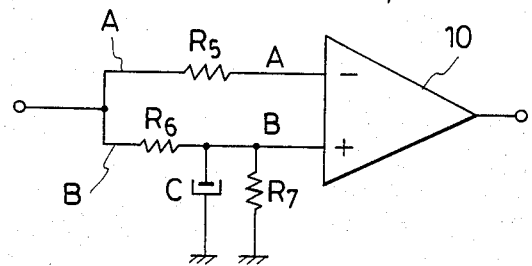
FIG. 5 is a circuit diagram of the judging circuit.

The output voltage thus obtained from the detector 8 is applied to the comparator 10 in the judging circuit 8' as shown in FIG. 5. The output voltage is separated into two routes, namely, route A including the resistor $R_5$ and route B including a time constant circuit which comprises the resistors $R_6$, $R_7$ and the capacitor C. The separated voltages are applied to the (−) terminal and to the (+) terminal of the comparator 10, respectively, for comparison and computation thereby. In this case, while the separated output voltage to the (−) terminal is supplied via the resistor $R_5$, the separated output voltage to the (+) terminal is supplied after voltage division by the resistors $R_6$ and $R_7$. Further, the charging/discharging capacitor C is connected to the (+) terminal. Therefore, the separated output voltage to the (+) terminal is influenced by the time constant circuit. The (+) terminal is designed to normally receive the separated output voltage smaller than that the (−) terminal receives.

Figure 6:
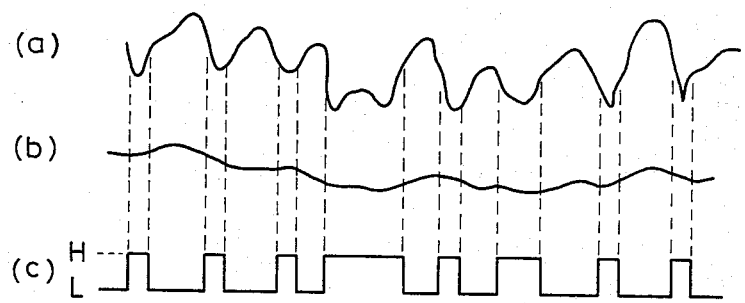
FIGS. 6 and 8 show waveforms.

When the car runs carrying the receiver including said comparator 10 for a certain distance, output voltages with waveforms as shown by (a), (b) and (c) in FIG. 6 are obtained from the respective terminals of the comparator 10. The waveform (a) corresponds to the separated output voltage applied to the (−) terminal via the route A and shows that this voltage varies in accordance with change of receiving condition. The waveform (b) corresponds to the separated output voltage applied to the (+) terminal via the route B, and shows that variation of this voltage is moderated due to the time constant circuit with combination of the resistor $R_6$ and the capacitor C or with the combination of the resistor $R_7$ and the capacitor C. The waveform (c) corresponds to the output supplied from the comparator 10 as the result of comparison and computation of the both separated voltages shown by the waveforms (a) and (b). The comparator 10 supplies an H (high level) signal, for example, when the detector voltage lowers down the average level due to electric field variation caused by a bad receiving condition, and supplies an L (low level) signal when the detector voltage becomes higher than the average level, thereby allowing judgement that the receiving condition is good when the L signal is supplied, or bad when the H signal is supplied.

Figure 7:
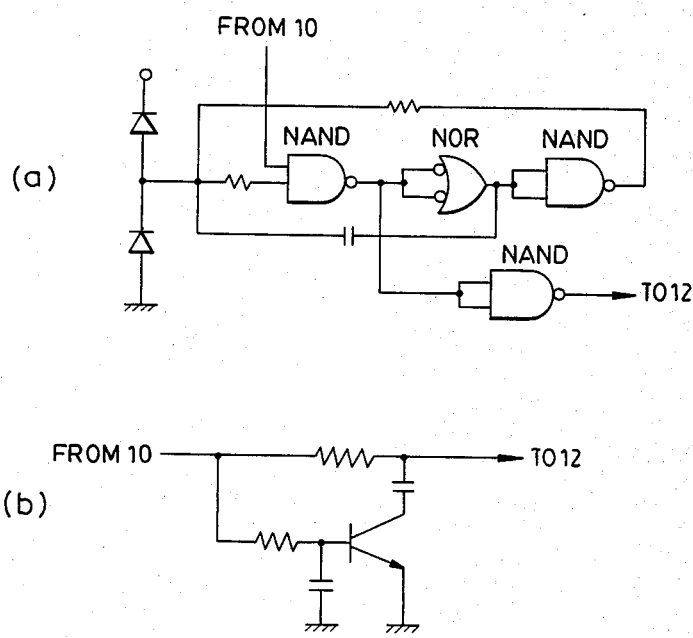
FIGS. 7a and 7b are circuit diagrams showing examples of the pulse generator.

The output signal from the comparator 10 is applied to the pulse generator 11 of the control circuit 9. The pulse generator 11 is designed to act and generate pulses only when the comparator 10 supplies the H level signal (when the receiving condition is bad). The pulse generator 11 may be constructed by a continuous pulse generating circuit as shown in FIG. 7a, for example, which generates continuous pulses in response to the output signal from the comparator 10, or by a single pulse generating circuit as shown in FIG. 7b which generates one pulse per each comparator output signal.

Figure 8:
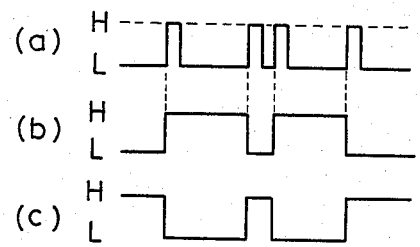

The output signal from the pulse generator 11 is applied to the flip-flop 12. The flip-flop 12 generates a Q output as shown by (b) in FIG. 8 or $\overline{Q}$ output as shown by (c) in response to the output signal as shown by (a) from the comparator 10. The Q output is applied to the transistor $T_{r1}$ of the antenna selecting circuit 2 while the $\overline{Q}$ output is applied to the transistor $T_{r2}$.

Since the Q output and $\overline{Q}$ output of the flip-flop 12 alternatively become H level every time when the comparator 10 supplies the H level signal, the transistors $T_{r1}$ and $T_{r2}$ are alternatively turned on.

For example, when the Q output is L level, the transistor $T_{r1}$ is turned off, thereby making the current path from the operating antenna indicating LED $D_3$ through the choke coil $L_1$ and the antenna switching pin diode $D_1$ to the choke coil $L_2$. Due to this, while the operating antenna indicating LED $D_3$ is lit on, the antenna switching pin diode $D_1$ is turned on, thereby allowing the antenna 1a to be connected to the receiver 13.

When the $\overline{Q}$ output is L level, the transistor $T_{r2}$ is turned on, thereby making the current path from the operating antenna indicating LED $D_4$ through the choke coil $L_3$ and the antenna switching pin diode $D_2$ to the choke coil $L_2$. Due to this, while the operating antenna indicating LED $D_4$ is lit on, the antenna switching pin diode $D_2$ is turned on, thereby causing changeover of the antenna 1a to the antenna 1b so as to connect the latter to the receiver 13.

Looking at the operating antenna indicating LED $D_3$ and $D_4$, it is possible to known which antenna is now connected to the receiver.

The above-described pulse generator 11 is not a subject matter of this invention. However, it is effective in having the flip-flop 12 reliably operate freely from influence by noises when the comparator 10 supplies an H level signal. It should be noted that when the receiving condition is good and the comparator 10 supplies an L level signal, the pulse generator 11 stops its action, thereby preventing switching from one antenna to the other.

To perform switching action of the antennas, other switch means such as high-speed relay may be used instead of the pin diodes.

As described in the above, the diversity receiver according to the present invention including plural antennas and only one tuner effects, on one hand, multipath noise reduction and S/N improvement, and on the other hand, leads to reduction of production cost and space.

In the foregoing description, the judging circuit 8' is designed to detect a dc voltage proportional to the electric field strength or a dc voltage proportional to the multipath level. However, the voltage to be detected may be a resultant one of said both dc voltages.

Also, more than two antennas may be used.

We claim:

1. A diversity receiver comprising:
a plurality of antennas;
antenna selecting means to which said antennas are connected;
a receiver to which an antenna output from said antenna selecting means is applied;
detector means for detecting signal voltage responsive to said antenna output from an output of an intermediate frequency amplifier of said receiver;
judging means responsive to a signal voltage from said detector means for generating a judgement signal indicating whether receiving condition of the one of said antennas in use is good or not;

control means for actuating said antenna selecting means so as to select one of said antennas which is in a better receiving condition;

said judging means having a comparator and a time constant circuit, said comparator having two input terminals connected to an output of said detector means by two respective paths, said time constant circuit being connected between one of said paths and ground; wherein said antenna selecting means includes diodes connected between respective outputs of said antennas and an input of said receiver, a voltage supply connected to inputs of said diodes for biasing said diodes conductive for conducting the output from their respective antennas to said receiver input, and means connecting respective transistors to said inputs of said diodes, said control means having means actuable for alternatively clamping said diodes nonconductive by rendering conductive the corresponding transistor.

2. A diversity receiver as set forth in claim 1 wherein said control means includes a pulse generator providing the sole output path from said comparator to a flip-flop circuit, which is directly connected to said pulse generator.

3. A diversity receiver as set forth in claim 1 wherein said detector means includes a rectifier circuit to rectify outputs from said intermediate frequency amplifier of said receiver.

4. A diversity receiver as set forth in claim 1 wherein said connecting means includes light-emitting diodes respectively connected in series between said respective inputs of the first-mentioned diodes and the associated transistors for conducting and illuminating except when clamped off by conduction of the corresponding transistor.

5. A diversity receiver as set forth in claim 1 wherein said detector means consists of an S meter and a rectifier circuit both connected to said intermediate frequency amplifier of the receiver.

6. A diversity receiver comprising:
a plurality of antennas;
antenna selecting means to which said antennas are connected;
a receiver to which an antenna output from said antenna selecting means is applied;
detector means for detecting a signal voltage which is responsive to said antenna output and taken from an output of an intermediate frequency amplifier of said receiver;
a comparator having a first input terminal connected through a first resistor to the output of said detector means, said comparator having a second input terminal connected through a second resistor to said output of said detector means and through a parallel capacitor and third resistor to circuit ground, said second and third resistors and capacitor comprising a time constant circuit;
a noise isolating means and a flip-flop in series providing the signal connection from the output of said comparator to said antenna selecting means, said noise isolating means being a pulse generator as the sole signal connection from the comparator to the flip-flop, said flip-flop having first and second alternately actuated output terminals switched in response to detection by said detector means of bad reception by the antenna;
said antenna selecting means comprising first and second transistors having bases respectively connected to said first and second flip-flop output terminals, said transistors each having a main current electrode connected both to a voltage source and to a respective light-emitting diode, each said antenna being connected through a respective biasable diode to said receiver, respective means connecting each light-emitting diode to a point between a respective antenna and biasable diode, each said light-emitting diode being responsive to turning off of its corresponding transistor for lighting and thereby biasing its respective biasable diode to apply antenna signal from its respective antenna to said receiver, said transistors each having its main current electrodes connected to short its said light-emitting diode upon conduction of said transistor and thereby block passage of antenna signal from its corresponding antenna to said receiver.

* * * * *